United States Patent
Ryu et al.

(10) Patent No.: US 9,896,127 B2
(45) Date of Patent: Feb. 20, 2018

(54) VEHICLE STEERING CONTROL APPARATUS AND METHOD FOR LANE KEEPING

(71) Applicant: HYUNDAI MOBIS Co., Ltd, Seoul (KR)

(72) Inventors: Kyoung Jin Ryu, Yongin-si (KR); Eun Young You, Yongin-si (KR); Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 69 days.

(21) Appl. No.: 14/957,980

(22) Filed: Dec. 3, 2015

(65) Prior Publication Data

US 2016/0159394 A1 Jun. 9, 2016

(30) Foreign Application Priority Data

Dec. 5, 2014 (KR) .......................... 10-2014-0173468

(51) Int. Cl.
*B62D 15/02* (2006.01)
*B62D 5/04* (2006.01)
*B60W 30/12* (2006.01)

(52) U.S. Cl.
CPC .......... *B62D 15/025* (2013.01); *B60W 30/12* (2013.01); *B62D 5/049* (2013.01); *B62D 5/0481* (2013.01); *B62D 5/0484* (2013.01); *B62D 5/0493* (2013.01)

(58) Field of Classification Search
CPC .. B62D 15/025; B62D 5/0481; B62D 5/0484; B62D 5/049; B62D 5/0493; B60W 30/12
See application file for complete search history.

(56) References Cited

U.S. PATENT DOCUMENTS

| | | | | |
|---|---|---|---|---|
| 6,580,986 B1* | 6/2003 | Uenuma | ............. | B62D 15/025 701/41 |
| 7,307,545 B2* | 12/2007 | Nishida | ............. | G06K 9/00798 701/1 |
| 7,698,032 B2* | 4/2010 | Matsumoto | .......... | B62D 15/025 701/36 |
| 8,630,793 B2* | 1/2014 | Takemura | ............. | B60W 30/12 701/1 |
| 2011/0125369 A1* | 5/2011 | Roh | ........................ | B62D 1/28 701/41 |
| 2015/0149036 A1* | 5/2015 | You | ....................... | B60W 30/12 701/1 |

FOREIGN PATENT DOCUMENTS

| | | |
|---|---|---|
| KR | 10-2014-0062240 A | 5/2014 |
| KR | 10-1401932 B1 | 6/2014 |

* cited by examiner

*Primary Examiner* — Dale W Hilgendorf
(74) *Attorney, Agent, or Firm* — NSIP Law (57) ABSTRACT

Provided are related to a vehicle steering control apparatus and a method for lane keeping, in which the performance of lane keeping support is improved by correcting lane information of a camera. The vehicle steering control apparatus for lane keeping includes a correction unit which estimates lane information to be subsequently input using self-feedback lane information, and corrects lane information determined in a misrecognized state when present input lane information is determined in the misrecognized state using the estimated lane information, and a steering controller configured to control steering of a vehicle in consideration of the lane information corrected by the correction unit.

14 Claims, 5 Drawing Sheets

VEHICLE STEERING CONTROL APPARATUS AND METHOD FOR LANE KEEPING

CROSS-REFERENCE TO RELATED APPLICATION

This application claims priority to and the benefit of Korean Patent Application No. 10-2014-0173468, filed on Dec. 5, 2014, the disclosure of which is incorporated herein by reference in its entirety.

BACKGROUND

1. Field of the Invention

The present invention relates to a vehicle steering control and a method for lane keeping, and more particularly, an apparatus and a method in which the performance of lane keeping support is improved by correcting misrecognized lane information.

2. Discussion of Related Art

Generally, as a lane keeping assistant apparatus assists a vehicle not to departure from a lane using lane information measured from a camera, the vehicle can be more precisely controlled so as not to depart from the lane in proportion to the accuracy of the lane information measured from the camera.

Meanwhile, external factors, such as guardrails, interconnections between roads, and tunnels which are installed on the roads, in addition to environmental factors, such as snow, rain, and backlight, influence road information measured from the camera.

When the lane is non-recognized or misrecognized due to the above factors, the performance of the lane keeping assistant apparatus for controlling the vehicle not to depart from the lane becomes unstable, and thus the reliability of lane keeping cannot be ensured.

Accordingly, in order to ensure the reliability of the lane keeping (to secure accurate lane information), studies, in which the lane keeping assistant apparatus can more precisely determine lane misrecognition, are actively in progress.

However, such a lane keeping assistant apparatus can more precisely determine only lane nonrecognition, and there is still a problem that the accuracy of lane misrecognition is lowered or the accuracy of estimated value is lowered.

Further, when the lane keeping assistant apparatus estimates the lane using multiple filters, the estimation using the multiple filters compensates for the lane using a lane width (a predetermined value) and noise, but since the lane width is an arbitrary value instead of actual road information, there is a problem that the accuracy of the estimation is also lowered.

To solve the above-described problems, studies, in which nonrecognition or misrecognition of a lane is determined based on lane information transmitted from a camera, and the lane information is compensated to improve the reliability of the lane information, are also actively in progress.

However, such a lane keeping assistant apparatus determines the misrecognition or nonrecognition of the lane based on the reliability of the camera and variation of lane distance information, but since a heading angle of a vehicle, curvature of the lane, and a rate of change in the curvature are not considered, this is also a limitation for improving the reliability of the lane information by compensating for the lane information.

SUMMARY OF THE INVENTION

The present invention is directed to a vehicle steering control and a method for lane keeping apparatus, in which the performance of lane keeping support is improved by correcting misrecognized lane information.

According to an aspect of the present invention, there is provided a vehicle steering control apparatus for lane keeping including a correction unit which estimates lane information to be subsequently input using self-feedback lane information, and corrects lane information determined in a misrecognized state when present input lane information is determined in a misrecognized state using the estimated lane information, and a steering controller configured to control steering of a vehicle in consideration of the lane information corrected by the correction unit.

The correction unit may include a lane information recognition state determining unit which estimates the lane information to be subsequently input using feedback lane information, determines a permissible recognition range with respect to the lane information to be subsequently input using the estimated lane information, and determines the present input lane information in the misrecognized state when the present input lane information exists out of the determined permissible recognition range, and a lane information correction unit which corrects the lane information determined in the misrecognized state by the lane information recognition state determining unit using the lane information estimated by the lane information recognition state determining unit, and feeds the corrected lane information back to the lane information recognition state determining unit.

The lane information may include at least one of information on a left distance from the center of a bumper of the vehicle to a left lane, information on a right distance from the center of the bumper of the vehicle to a right lane, information on a heading angle of the vehicle, information on curvature of a lane, information on a differential of the curvature, information on the reliability of the lane information, information on a width of the lane, information on a viewing angle of a camera, information on the reliability of the camera, and information on the visibility of the camera.

The lane information recognition state determining unit may estimate the lane information to be subsequently input using the feedback lane information, information on a yaw rate of the vehicle, and information on a speed of the vehicle, set an error range with respect to each of the information on the left distance from the center of the bumper of the vehicle to the left lane of the estimated lane information, the information on the right distance from the center of the bumper of the vehicle to the right lane of the estimated lane information, the information on the heading angle of the vehicle of the estimated lane information, the information on the curvature of the lane of the estimated lane information, and information on the differential of the curvature of the estimated lane information using pre-test information, and determine a permissible recognition range with respect to the lane information to be subsequently input in consideration of each set error range.

When the lane information determined in the misrecognized state is information on any one of left and right lanes, the lane information correction unit may calculate an average value of widths of lanes through which the vehicle travels for a predetermined time, correct the misrecognized lane information using the calculated average value and the other recognized lane information, and feed the corrected lane information and the other recognized lane information back to the lane information recognition state determining unit.

When the lane information determined in the misrecognized state is information on both of the left and right lanes, the lane information correction unit may calculate an average value of widths of lanes through which the vehicle travels for a predetermined time, correct information on the left and right lanes using the calculated average value and the lane information estimated by the lane information recognition state determining unit, and feed the corrected information on the left and right lanes back to the lane information recognition state determining unit.

According to another aspect of the present invention, there is provided a method of a vehicle steering control for lane keeping including estimating lane information to be subsequently input using feedback lane information, correcting lane information determined in a misrecognized state when present input lane information is determined in a misrecognized state using the estimated lane information, and controlling steering of a vehicle in consideration of the corrected lane information.

The correcting of the lane information may include determining a permissible recognition range with respect to the lane information to be subsequently input using the estimated lane information, determining the present input lane information in a misrecognized state when the present input lane information exists out of the determined permissible recognition range, and correcting the lane information determined in the misrecognized state using the estimated lane information, and performing feedback of the corrected lane information.

The lane information may include at least one of information on a left distance from the center of a bumper of a vehicle to a left lane, information on a right distance from the center of the bumper of the vehicle to a right lane, information on a heading angle of the vehicle, information on curvature of a lane, information on a differential of the curvature, information on the reliability of the lane information, information on a width of the lane, information on a viewing angle of a camera, information on the reliability of the camera, and information on the visibility of the camera.

The determining of the permissible recognition range may include setting an error range with respect to each of the information on the left distance from the center of the bumper of the vehicle to the left lane of the estimated lane information, the information on the right distance from the center of the bumper of the vehicle to the right lane of the estimated lane information, the information on the heading angle of the vehicle of the estimated lane information, the information on the curvature of the lane of the estimated lane information, and the information on the differential of the curvature of the estimated lane information using pre-test information, and determining a permissible recognition range with respect to the lane information to be subsequently input in consideration of each set error range.

The performing of the feedback of the corrected lane information may include calculating an average value of widths of lanes through which the vehicle travels for a predetermined time when the lane information determined in the misrecognized state is information on any one of left and right lanes, correcting the misrecognized lane information using the calculated average value and the other recognized lane information, and feeding the corrected lane information and the other recognized lane information back to the lane information recognition state determining unit.

The performing of the feedback of the corrected lane information may include calculating an average value of widths of lanes through which the vehicle travels for a predetermined time when the lane information determined in the misrecognized state is information on both of left and right lanes, correcting the information on the left and right lanes using the calculated average value and the lane information estimated by the lane information recognition state determining unit, and feeding the corrected information on the left and right lanes back to the lane information recognition state determining unit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will now be described more fully with reference to the accompanying drawings to clarify aspects, features, and advantages of the present invention.

The invention may, however, be embodied in many different forms and should not be construed as being limited to the embodiments set forth herein. Rather, these embodiments are provided so that this disclosure will be through and complete, and will fully convey the concept of the invention to those of ordinary skill in the art. The present invention is defined by the appended claims.

Meanwhile, the terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Conventionally, lane misrecognition and lane nonrecognition have been described separately, but in the description of a vehicle steering control apparatus for lane keeping according to one embodiment of the present invention, an example of only lane misrecognition will be described without distinguishing between the lane misrecognition and the lane nonrecognition. However, the present invention is not limited thereto, and the lane misrecognition may also be expanded back to the lane misrecognition and the lane nonrecognition.

Figure 1:
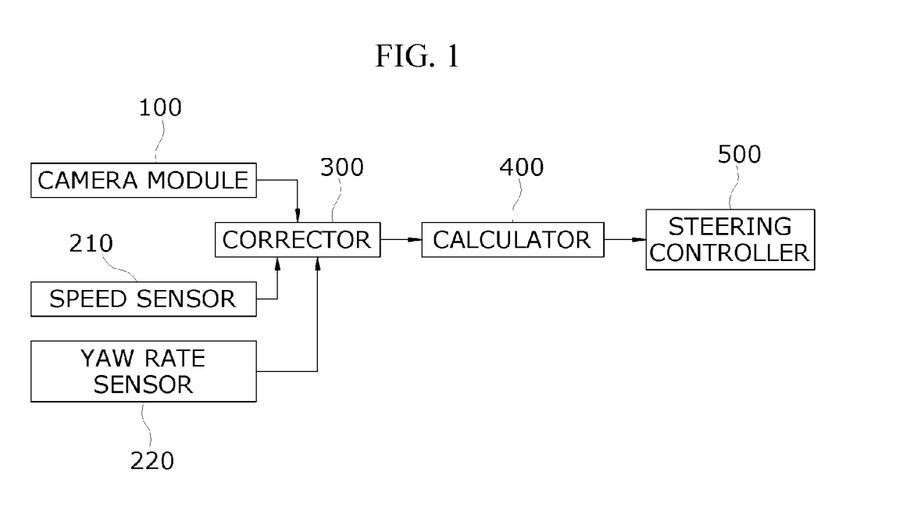
FIG. 1 is a block diagram illustrating a vehicle steering control apparatus for lane keeping according to one embodiment of the present invention.
Figure 2:
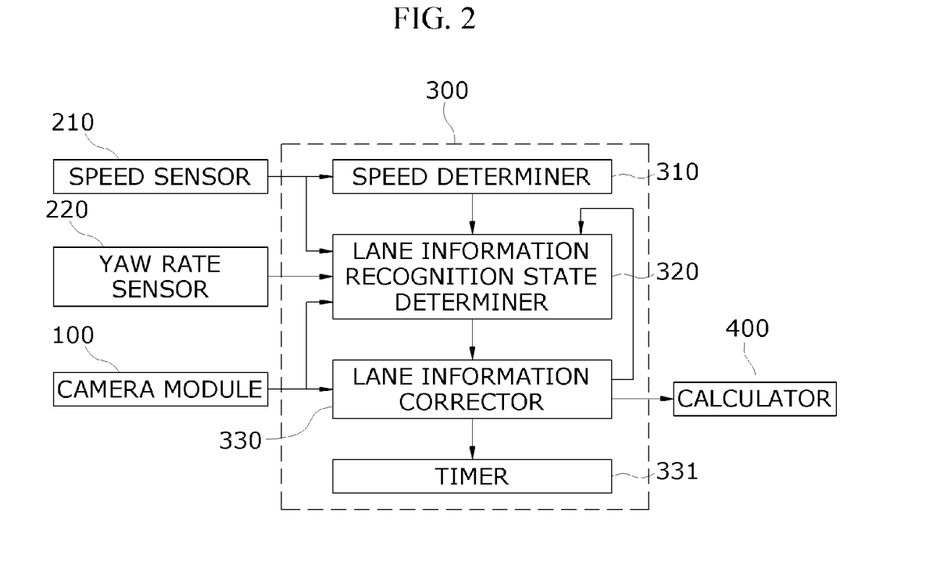
FIG. 2 is a view illustrating a correction unit shown in FIG. 1 in detail.

Hereinafter, a vehicle steering control apparatus for lane keeping according to one embodiment of the present invention will be described with reference to FIGS. 1 and 2. FIG. 1 is a block diagram illustrating the vehicle steering control apparatus for lane keeping according to one embodiment of the present invention, and FIG. 2 is a view illustrating a correction unit shown in FIG. 1 in detail.

As shown in FIG. 1, the vehicle steering control apparatus for lane keeping according to one embodiment of the present invention includes a camera module 100, a speed sensor 210, a yaw rate sensor 220, a correction unit 300, a calculating unit 400, and a steering controller 500.

The camera module 100 photographs a lane of a driving vehicle using a camera mounted in the vehicle, and lane information on the photographed lane is transmitted to the correction unit 300.

Here, the lane information includes information on a left distance from the center of a bumper of the vehicle to a left lane, information on a right distance from the center of the bumper of the vehicle to a right lane, information on a heading angle of the vehicle, information on curvature of a lane, information on a differential of the curvature, information on the reliability of the lane information, information on a width of the lane, information on a viewing angle of the camera, information on the reliability of the camera, information on the visibility of the camera, etc.

Meanwhile, the camera module 100 may photograph a left lane of the vehicle using a left camera mounted on a left side of the vehicle, may photograph a right lane of the vehicle using a right camera mounted on a right side of the vehicle, and may transmit information on the photographed left and right lanes to the correction unit 300.

Further, the camera module 100 photographs a lane of the vehicle using one camera mounted on the vehicle, information on a heading angle of the vehicle, information on curvature of the lane, information on differential of the curvature, information on the reliability of the lane information, information on a width of the lane, information on a viewing angle of the camera, information on the reliability of the camera, information on the visibility of the camera, and/or the like are transmitted to the correction unit 300 without distinguishing between the left and right sides, and only distance information may be classified into information on a left distance and information on a right distance which may be transmitted to the correction unit 300.

Accordingly, the lane information may be photographed using one camera, or may be photographed using each of the left and right cameras. Here, the vehicle steering control apparatus for lane keeping according to one embodiment of the present invention will be described by classifying the camera into the left and right cameras, and classifying the lane information into information on the left lane and information on the right lane.

The correction unit 300 determines a recognition state of present input information on the left and right lanes using information on the left and right lanes previously input from the camera module 100 right before the present input information, information on a speed of the vehicle transmitted from the speed sensor 210, information on a yaw rate of the vehicle transmitted from the yaw rate sensor 220, etc. The correction unit 300 corrects the present input information on the left and right lanes according to the determination result, and the corrected information on the left and right lanes is transmitted to the calculating unit 400.

For example, when information on the left lane of the present information on the left and right lanes input from the camera module 100 is determined to be in a misrecognized state, the correction unit 300 corrects the information on the left lane determined in the misrecognized state. The correction unit 300 transmits the corrected information on the left lane and the recognized information on the right lane to the calculating unit 400.

The calculating unit 400 calculates a steering torque using information on the left lane (the corrected lane information) and information on the right lane (not corrected lane information) transmitted from the correction unit 300, and the calculated steering torque is transmitted to the steering controller 500.

The steering controller 500 controls steering of the vehicle according to the steering torque transmitted from the calculating unit 400.

Here, since the process of the calculating unit 400 for calculating the steering torque using information on the left and right lanes is the same as that of a related art, detailed descriptions of the process will be omitted.

Hereinafter, a process of determining a recognition state of information on left and right lanes of the correction unit 300 and correcting information on the left and right lanes will be described with reference to FIG. 2 in more detail.

As shown in FIG. 2, the correction unit 300 includes a speed determining unit 310, a lane information recognition state determining unit 320, and a lane information correction unit 330.

The speed determining unit 310 determines whether a speed of a vehicle is a preset speed or more using information on the speed of the vehicle transmitted from the speed sensor 210 so that a vehicle steering control for lane keeping is performed only when the vehicle is moving at the preset speed or more.

As a determination result of the speed determining unit 310, when the speed of the vehicle is the preset speed or more, the lane information recognition state determining unit 320 estimates information on left and right lanes, which may be subsequently input from the camera module 100, using information on the left and right lanes fed back from the lane information correction unit 330.

The lane information recognition state determining unit 320 determines a permissible recognition range with respect to information on the left and right lanes, which may be subsequently input from camera module 100, using the estimated information on the left and right lanes.

For example, the lane information recognition state determining unit 320 may estimate information on the left and right lanes, which may be subsequently input from the camera module 100, by Equation 1 using information on distances from the center of a bumper of the vehicle to left and right lanes included in information on the left and right lanes fed back from the lane information correction unit 330, information on a heading angle of the vehicle, information on curvature of a lane, information on differential of the curvature, information on a speed of the vehicle transmitted from the speed sensor 210, and information on a yaw rate of the vehicle transmitted from the yaw rate sensor 220.

$$Y = \alpha + \beta X + \gamma X^2 + \delta X^3 \qquad \text{[Equation 1]}$$

(where, Y: lateral directional axis, X: longitudinal directional axis, $\alpha$: offset information, $\beta$: information on a heading angle of a vehicle, $\gamma$: information on curvature of a lane (½ of actual curvature), and $\delta$: information on a differential of the curvature (⅙ of a differential value of the actual curvature))

For example, when information on a right lane, which may be subsequently input from the camera module 100, is estimated by Equation 1 using information on a right lane fed back from the lane information correction unit 330, information on a speed of a vehicle, and yaw rate information, the lane information recognition state determining unit 320 may obtain a lane model equation using α fed back from distance information of information on the right lane, X fed back from information on a travel distance of the vehicle based on a preset travel time and information on the speed of the vehicle, β fed back from information on a heading angle of the vehicle of information on the right lane, γ fed back from information on curvature of a lane of information on the right lane, δ fed back from information on a differential of the curvature of information on the right lane.

The lane information recognition state determining unit 320 obtains offset information $\alpha_{k+1}$ corresponding to the estimated information on the right lane by Equation 2 using offset information $\alpha_k$ corresponding to the obtained feedback information on the right lane, information on the heading angle of the vehicle $\beta_k$ fed back from information on the right lane, information on curvature of the lane $\gamma_k$ fed back from information on the right lane, information on the differential of the curvature $\delta_k$ fed back from information on the right lane, information on a rotating angle of the vehicle ($\Delta\theta$=Yawrate×$\Delta T$) based on information on the yaw rate of the vehicle (Yawrate) and the preset travel time ($\Delta T$), and information on the travel distance of the vehicle ($\Delta X$=V$\Delta T$ cos($\theta+\Delta\theta$)) based on speed information (V) in consideration of information on the rotating angle of the vehicle ($\Delta\theta$) and the preset travel time ($\Delta T$), and distance information from the center of the bumper of the vehicle to the right lane ($\Delta Y$=V$\Delta T$ sin($\theta+\Delta\theta$)) based on the speed information (V) in consideration of information on the rotating angle of the vehicle ($\Delta\theta$) and the preset travel time ($\Delta T$).

$$\alpha_{k+1}=\alpha_k+\beta_k\Delta X+\gamma_k\Delta X^2+\delta_k\Delta X^3+\Delta Y \quad \text{[Equation 2]}$$

The lane information recognition state determining unit 320 obtains information on a heading angle of the vehicle $\beta_{k+1}$ of the estimated information on the right lane by Equation 3 using information on the heading angle of the vehicle $\beta_k$ fed back from information on the right lane, information on the curvature of the lane $\gamma_k$ fed back from information on the right lane, information on the differential of the curvature $\delta_k$ fed back from information on the right lane, information on the rotating angle of the vehicle $\Delta\theta$ based on information on the yaw rate of the vehicle (Yawrate) and the preset travel time $\Delta T$, and the speed information (V) based on information on the rotating angle of the vehicle ($\Delta\theta$), and information on the travel distance of the vehicle ($\Delta X$) based on the preset travel time ($\Delta T$).

$$\beta_{k+1}=\beta_k+2\gamma_k\Delta X+3\delta_k\Delta X^2+\Delta\theta \quad \text{Equation [3]}$$

The lane information recognition state determining unit 320 obtains information on curvature of the lane of vehicle $\gamma_{k+1}$ of the estimated information on the right lane by Equation 4 using information on curvature of the lane $\gamma_k$ fed back from information on the right lane, information on the differential of the curvature $\delta_k$ fed back from information on the right lane, information on the rotating angle of the vehicle ($\Delta\theta$) based on information on the yaw rate of the vehicle (Yawrate) and the preset travel time ($\Delta T$), information on the speed of the vehicle (V) in consideration of information on the rotating angle of the vehicle ($\Delta\theta$), and information on the travel distance of the vehicle ($\Delta X$) based on the preset travel time ($\Delta T$).

$$\gamma_{k+1}=\gamma_k+3\delta_k\Delta X \quad \text{[Equation 4]}$$

The lane information recognition state determining unit 320 obtains estimated information on a differential of the curvature of information on the right lane $\delta_{k+1}$ by Equation 5 using information on the differential of the curvature fed back from information on the right lane.

$$\delta_{k+1}=\delta_k \quad \text{[Equation 5]}$$

The lane information recognition state determining unit 320 finally obtains estimated distance information from the center of the bumper of the vehicle to the right lane of information on the right lane by Equation 1 using offset information $\alpha_{k+1}$ corresponding to the estimated information on the right lane, information on the heading angle of the vehicle $\beta_{k+1}$ of the estimated information on the right lane, information on the curvature of the lane $\gamma_{k+1}$ of the estimated information on the right lane, information on the differential of the curvature $\delta_{k+1}$ of the estimated information on the right lane, and information on the travel distance of the vehicle ($\Delta X$=V$\Delta T$ cos($\theta+\Delta\theta$)) based on information on the speed of the vehicle (V) in consideration of information on the rotating angle of the vehicle ($\Delta\theta$) and the preset travel time ($\Delta T$) as each of α, β, γ, δ, and X.

As described above, the lane information recognition state determining unit 320 sets an error range using pre-test information with respect to each of the estimated information on the left and right lanes using information on the left and right lanes fed back from the lane information correction unit 330, i.e., the distance information from the center of the bumper of the vehicle to left and right lanes, information on the heading angle of the vehicle, information on the curvature of the lane, and information on the differential of the curvature.

The lane information recognition state determining unit 320 determines a permissible recognition range with respect to information on the left and right lanes, which may be subsequently input from the camera module 100, in consideration of error ranges respectively set for the estimated distance information from the center of the bumper of the vehicle to the left and right lanes, information on the heading angle of the vehicle, information on the curvature of the lane, and information on the differential of the curvature.

Accordingly, the lane information recognition state determining unit 320 checks whether present information on the left and right lanes input from the camera module 100 exists in the determined permissible recognition range. According to the check result of the lane information recognition state determining unit 320, a recognition state with respect to the present input information on the left and right lanes is determined.

For example, when the present information on the left lane input from the camera module 100 does not exist in the determined permissible recognition range, the lane information recognition state determining unit 320 determines the present input information on the left lane in a misrecognized state.

As a determination result of the recognition state of the lane information recognition state determining unit 320, the lane information correction unit 330 performs at least one of non-correction, bypass, correction of information on one lane, and correction of information on both lanes with respect to the present information on the left and right lanes input from the camera module 100.

Hereinafter, the determination of the recognition state and a correctable mode setting operation of the lane information recognition state determining unit 320 will be described in more detail.

The lane information recognition state determining unit 320 determines whether the present input information on the left and right lanes is in a good state using the reliability of the present information on the left and right lanes input from the camera module 100.

For example, when the reliability of information on the left and right lanes is determined as a preset reliability or more using the reliability of the present information on the left and right lanes input from the camera module 100, the lane information recognition state determining unit 320 determines the present input information on the left and right lanes as the good state.

When the reliability of each camera is determined to be greater than a preset reliability using the reliability of each camera of the present information on the left and right lanes input from the camera module 100, a width between the left and right lanes is determined to be greater than a preset critical width using information on the width of the lane of the present input information on the left and right lanes, the visibility of the lane of each camera is determined to be greater than a preset critical visibility using the lane visibility of each camera of the present input information on the left and right lanes, the lane information recognition state determining unit 320 determines the present input information on the left and right lanes as a recognized state.

Alternatively, when the present information on the left and right lanes input from the camera module 100 exists in the determined permissible recognition range, the lane information recognition state determining unit 320 determines the present input information on the left and right lanes as the recognized state.

Further, when the reliability of each camera is determined as the preset reliability or more using the reliability of each camera of the present information on the left and right lanes input from the camera module 100, the lane information recognition state determining unit 320 determines the present input information on the left and right lanes as the recognized state.

As the determination result, when the present input information on the left and right lanes is in the recognized state while the present information on the left and right lanes input from the camera module 100 in the good state, the lane information recognition state determining unit 320 sets a correctable mode to a bypass mode.

As the determination result, when both lanes of the present input information on the left and right lanes are in misrecognized states while the present information on the left and right lanes input from the camera module 100 is in a bad state, the lane information recognition state determining unit 320 sets the correctable mode to an uncorrectable mode.

When any one of lanes of the present input information on the left and right lanes is in the misrecognized state while the present information on the left and right lanes input from the camera module 100 is in the good state, the lane information recognition state determining unit 320 sets the correctable mode to a correctable mode of information on one lane.

As the determination result, when both lanes of the present input information on the left and right lanes are in the misrecognized states while the present information on the left and right lanes input from the camera module 100 is in the good state, the lane information recognition state determining unit 320 sets the correctable mode to a correctable mode of information on the both lanes.

Hereinafter, a lane information correction operation of the lane information correction unit 330 according to a correctable mode setting result of the lane information recognition state determining unit 320 will be described in more detail.

The lane information correction unit 330 performs at least one of non-correction, bypass, correction of information on one lane, and correction of information on both lanes with respect to the present information on the left and right lanes input from the camera module 100 according to a correctable mode setting result of the lane information recognition state determining unit 320.

For example, according to the correctable mode setting result of the lane information recognition state determining unit 320, when the uncorrectable mode is set with respect to information on the left and right lanes, since the present information on the left and right lane input from the camera module 100 is in the bad state and both lanes of the present input information on the left and right lanes are in the misrecognized state, the lane information correction unit 330 transmits an uncorrectable signal to the calculating unit 400 to stop the vehicle steering control function for lane keeping.

When the calculating unit 400 receives the uncorrectable signal from the lane information correction unit 330, the calculating unit 400 transmits a vehicle steering control stop signal to the steering controller 500.

When the steering controller 500 receives the vehicle steering control stop signal from the calculating unit 400, the steering controller 500 stops the vehicle steering control for lane keeping and informs a driver of generation of an error in the lane keep function.

According to the correctable mode setting result of the lane information recognition state determining unit 320, when the bypass mode is set with respect to information on the left and right lanes, the lane information correction unit 330 transmits the present information on the left and right lanes transmitted from the camera module 100 to the calculating unit 400 without correction, and feeds the present information on the left and right lanes back to the lane information recognition state determining unit 320.

Meanwhile, the lane information correction unit 330 uses a timer for a time limit with respect to the correction of information on one lane or correction of information on both lanes. A time for the correction of information on one lane is greater than a time for the correction of information on both lanes. Further, the lane information correction unit 330 also uses a timer for a time limit with respect to the calculation of an average lane width before the correction of information on one lane and the correction of information on both lanes.

For example, according to the correctable mode setting result of the lane information recognition state determining unit 320, when the correctable mode of information on one lane, which may correct information on any one lane of the left and right lanes, is set, the lane information correction unit 330 sets a timer 331 to a preset time for the correction of information on one lane.

Then, the lane information correction unit 330 calculates an average value of widths of lanes through which the vehicle travels for a predetermined time, and corrects misrecognized lane information based on the calculated average value and the recognized state.

For example, when information on a left lane is in a misrecognized state, the lane information correction unit 330 calculates the average value of the widths of the lanes through which the vehicle travels for the predetermined time to correct information on the left lane. The lane information correction unit 330 corrects information on the left lane in the misrecognized state using the calculated average value and information on a right lane in the recognized state.

In a more detailed description for the above, when information on a left lane of the present information on the left and right lanes input from the camera module 100 is in the misrecognized state, the lane information correction unit 330 calculates a probability value according to the degree of departure of information on the left lane in the misrecognized state from the determined permissible recognition range. The lane information correction unit 330 determines a weighted value in inverse proportion to the probability value calculated according to the degree of departure of information on the left lane from the permissible recognition range.

For example, the lane information correction unit 330 may determine to decrease the weighted value in proportion to an increase in the calculated probability value.

The lane information correction unit 330 assigns the weighted value based on the calculated probability value to the misrecognized information on the left lane, and assigns the calculated probability value to information on a right lane in a recognized state.

The lane information correction unit 330 may correct information on the left lane in the misrecognized state by copying information on the right lane in the recognized state, to which the calculated probability value and the calculated average value of the widths of the lanes are assigned, to information on the left lane in the misrecognized state to which the weighted value is assigned.

For example, when a probability value calculated according to the degree of departure of information on the left lane from the permissible recognition range is 70%, the lane information correction unit 330 may determine a weighted value of 30% in inverse proportion to the calculated probability value.

The lane information correction unit 330 corrects the misrecognized information on the left lane, by using the average value of the calculated lane widths, assigning the weighted value of 30% to the misrecognized information on the left lane, and assigning the calculated probability value of 70% to the recognized information on the right lane.

That is, the lane information correction unit 330 corrects information on the left lane in the misrecognized state, by using the average value of the calculated lane widths, removing 70% of information on the left lane so that 30% of the information on the left lane in the misrecognized state remains, and copying 70% of information on the right lane in the recognized state to the removed 70% of information on the left lane.

When the correction of information on one lane is in a completed state but the timer 331 is not in a timed-out state, the lane information correction unit 330 resets the timer 331, transmits the corrected lane information and the recognized lane information to the calculating unit 400, and feeds the corrected lane information and the recognized lane information back to the lane information recognition state determining unit 320.

When the correction of information on one lane is in the completed state and the timer 331 is in the timed-out state, the lane information correction unit 330 does not reset the timer 331, transmits the corrected lane information and the recognized lane information to the calculating unit 400, and feeds the corrected lane information and the recognized lane information back to the lane information recognition state determining unit 320.

Further, according to the correctable mode setting result of the lane information recognition state determining unit 320, when the correctable mode of information on both lanes, which corrects information on both of the left and right lanes, is set, the lane information correction unit 330 sets the timer 331 to a time for the correction of information on both lanes.

The lane information correction unit 330 calculates an average value of widths of lanes through which the vehicle travels for a predetermined time. The lane information correction unit 330 corrects information on the both lanes using information on the left and right lanes estimated by the lane information recognition state determining unit 320 and the calculated average value of the widths of the lanes.

When the correction of information on both lanes is in a completed state but the timer 331 is in a timed-out state, the lane information correction unit 330 resets the timer 331, transmits the corrected information on the left and right lanes to the calculating unit 400, and feeds the corrected information on the left and right lanes back to the lane information recognition state determining unit 320.

When the correction of information on both lanes is in the completed state and the timer 331 is in the timed-out state, the lane information correction unit 330 does not reset the timer 331, transmits the corrected information on the left and right lanes to the calculating unit 400, and feeds the corrected information on the left and right lanes back to the lane information recognition state determining unit 320.

Here, the time for the correction of information on one lane and the time for the correction of information on both lanes are sufficient times, for which the lane information correction unit 330 may complete the correction of information on one lane and information on both lanes, and are preset times based on information obtained through pre-testing.

Here, the case, in which the lane information correction unit 330 has not completed the correction of information on one lane and the correction of information on both lanes and the timer 331 is in the timed-out state, is not considered. Accordingly, the case, in which the timer 331 is in the timed-out state, is the case in which the lane information correction unit 330 has completed the correction of information on one lane and the correction of information on both lanes. That is, since the timer 331 is operated to prevent the performance of correction once again with respect to the correction of information on one lane and information on both lanes in a state in which the lane information correction unit 330 completes the correction of information on one lane and information on both lanes, the case, in which the lane information correction unit 330 has not completed the correction of information on one lane and the correction of information on both lanes and the timer 331 is in the timed-out state, is inconsistent with the spirit of the present invention, and thus may not be considered.

To summarize again, the case, in which the timer 331 herein is in the timed-out state, is the case in which the lane information correction unit 330 completes the correction of information on one lane and the correction of information on both lanes using a time the same as the preset time, and the case, in which the timer 331 is not in the timed-out state, is the case in which the lane information correction unit 330 completes the correction of information on one lane and the correction of information on both lanes using a time shorter than the preset time for the correction.

Meanwhile, since the average lane width is an average value of widths of lanes through which the vehicle travels for a predetermined period, the lane information correction unit 330 does not perform the correction of lane information for the predetermined period for which the average lane width is calculated.

Further, the lane information correction unit 330 resets the average lane width in a section in which variation between a width of a lane, through which the vehicle travels, and a width of a lane, through which the vehicle will travel, (before and after lane widths) is generated such that the vehicle changes a lane, the vehicle passes through an intersection, the correction of lane information based on speed is performed, etc.

As described above, according to the embodiment of the present invention, it is advantageous to improve the performance of lane keeping support by correcting present lane information input from the camera module. Particularly, since lane keeping is supported based on the corrected lane information, it is advantageous to provide stable and comfortable riding quality without a sense of heterogeneity.

Figure 3A:
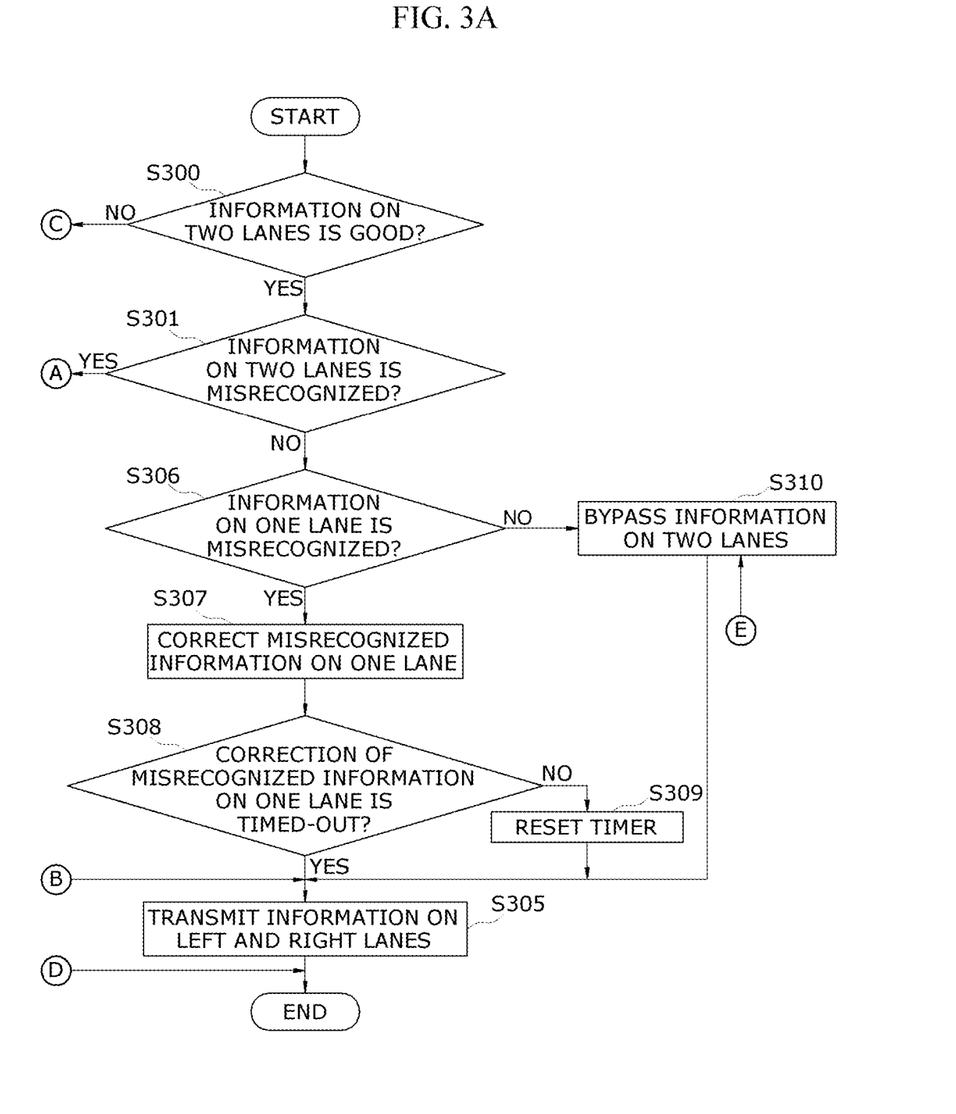
FIGS. 3A to 3C are flowcharts for describing a vehicle steering control method for lane keeping according to one embodiment of the present invention.
Figure 3B:
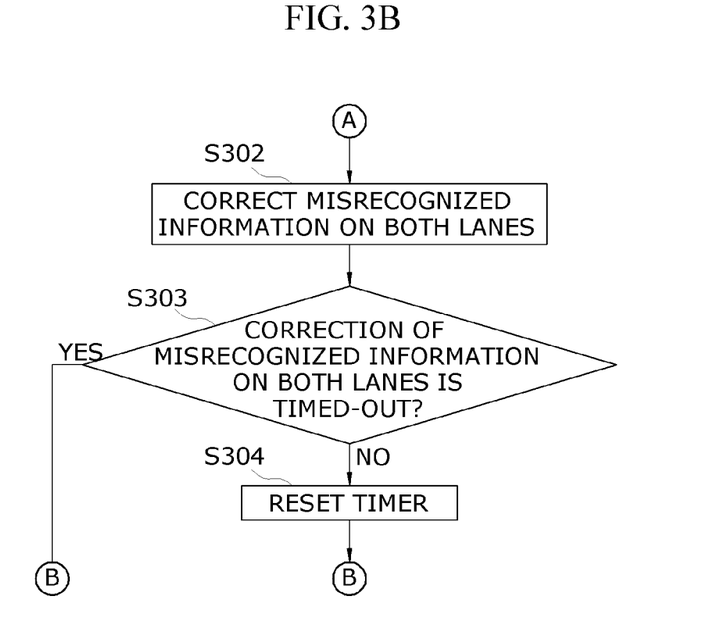
Figure 3C:
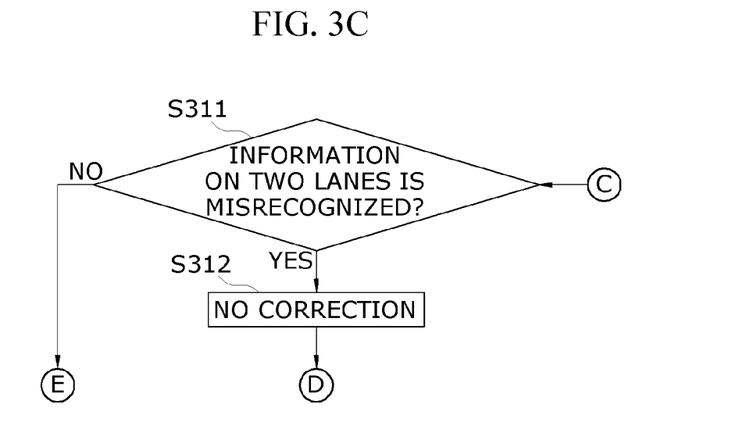

Hereinafter, a lane keeping support method according to one embodiment of the present invention will be described with reference to FIGS. 3A to 3C. FIGS. 3A to 3C are flowcharts illustrating the lane keeping support method according to one embodiment of the present invention.

As shown in FIGS. 3A to 3C, present input information on the left and right lanes is determined to be in a good state or not using information on the reliability of present information on the left and right lanes input from a camera module (S300).

For example, when the reliability of the present information on the left and right lanes input from the camera module is determined as a preset reliability or more, the present input information on the left and right lanes is determined to be in the good state.

As the determination result, when the present information on the left and right lanes input from the camera module is in the good state (Yes in operation S300), a recognition state of the present input information on the left and right lanes is determined according to whether the present input information on the left and right lanes exists in the determined permissible recognition range. Alternatively, the recognition state of the present input information on the left and right lanes is determined using information on the reliability of the present information on the left and right lanes input from the camera module (S301).

For example, when the present information on the left and right lanes input from the camera module is out of the determined permissible recognition range, the present input information on the left and right lanes is determined to be in a misrecognized state. Alternatively, when the reliability of a left camera and the reliability of a right camera is determined as a preset reliability or less using information on the reliability of a camera of the present information on the left and right lanes input from the camera module, the present input information on the left and right lanes may be determined to be in the misrecognized state.

As the determination result, when the present information on the left and right lanes input from the camera module is in the good state and the present input information on both of the left and right lanes is in misrecognized state (Yes in operation S301), a timer is set to a time for the correction of information on both lanes.

Then, information on left and right lanes, which may be subsequently input, is estimated using feedback information on the left and right lanes, and the yaw rate and speed information of the vehicle transmitted from a yaw rate sensor and a speed sensor. An average value of widths of lanes, through which the vehicle travels for a predetermined time, is calculated. Information on the left and right lanes is corrected by using the estimated information on the left and right lanes and the calculated average value (S302).

After the correction of the information on both lanes is completed, the timer is checked whether it is in a timed-out state (S303). As the checked result, when the timer is not in the timed-out state (No in operation S303), the timer is reset (S304) and the corrected information on both lanes is transmitted to a calculating unit (S305). However, as the checked result, when the timer is in the timed-out state (Yes in operation S303), the timer is not reset and the corrected information on both lanes is transmitted to the calculating unit (S305).

However, as the determination result in operation S301, when the present information on the left and right lanes input from the camera module is in the good state and the present input information on both of the left and right lanes is not misrecognized (No in operation S301), the present input information on any one of the left and right lanes is determined to be in the misrecognized state (S306).

As the determination result, when the present information on any one of the left and right lanes input from the camera module is in the misrecognized state (Yes in operation S306), the timer is set to a time for the correction of information on one lane.

Then, the average value of the widths of the lanes, through which the vehicle travels for the predetermined time, is calculated and the misrecognized lane information is corrected using the calculated average value and the recognized lane information (S307).

After the correction of the information on one lane is completed, the timer is checked whether it is in the timed-out state (S308). As the checked result, when the timer is not in the timed-out state (No in operation S308), the timer is reset (S309) and the corrected lane information and the recognized lane information are transmitted to the calculating unit (S305). However, as the checked result, when the timer is in the timed-out state (Yes in operation S308), the timer is not reset and the corrected lane information and the recognized lane information are transmitted to the calculating unit (S305).

Meanwhile, as the determination result in operation S306, when the present information on any one of the left and right lanes input from the camera module is not in the misrecognized state (No in operation S306), i.e., information on both lanes is in the recognized state, the present input information on the left and right lanes is bypassed without correction (S310). The bypassed information on the left and right lanes is transmitted to the calculating unit (S305).

Further, as the determination result in operation S300, when the present information on the left and right lanes input from the camera module is not in the good state (No in operation S300), a recognition state of the present input information on the left and right lanes is determined (S311).

As the determination result of the recognition state, when the present information on the left and right lanes input from the camera module is in the recognized state (No in operation S311), the present input information on the left and right lanes is bypassed without correction (S310).

However, as the determination result of the recognition state, when the present information on the left and right lanes input from the camera module is in the misrecognized state (Yes in operation S311), correction is not performed on the present input information on the left and right lanes (S312) and a vehicle steering control function for lane keeping stops.

According to the embodiment of the present invention, it is advantageous to improve the performance of lane keeping support by correcting the misrecognized lane information.

Particularly, since the lane keeping is supported based on the corrected lane information, it is advantageous to provide stable and comfortable riding quality without a sense of heterogeneity.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A control apparatus to steer a vehicle, comprising:
    a processor configured to
        estimate lane information to be subsequently input using self-feedback lane information, and correct lane information determined to be misrecognized, in response to present input lane information being determined to be misrecognized using the estimated lane information; and
        control steering of the vehicle based on the corrected lane information,
    wherein the correcting of the lane information comprises
        determining a permissible recognition range with respect to the lane information to be subsequently input using the estimated lane information, and
        setting an error range with respect to information on a differential of a curvature of the estimated lane information.

2. The vehicle steering control apparatus of claim 1, wherein the processor is further configured to:
    estimate the lane information to be subsequently input using feedback lane information, and determine the misrecognized present input lane information, in response to the present input lane information existing out of the determined permissible recognition range, and
    perform feedback of the corrected lane information.

3. The vehicle steering control apparatus of claim 2, wherein the lane information comprises any one or any combination of any two or more of information on a left distance from a center of a bumper of the vehicle to a left lane, information on a right distance from the center of the bumper of the vehicle to a right lane, information on a heading angle of the vehicle, information on the curvature of a lane, information on reliability of the lane information, information on a width of the lane, information on a viewing angle of a camera, information on the reliability of the camera, and information on the visibility of the camera.

4. The vehicle steering control apparatus of claim 3, wherein the processor is further configured to estimate the lane information to be subsequently input using the feedback lane information, information on a yaw rate of the vehicle, and information on a speed of the vehicle, to set an error range with respect to each of the information on the left distance from the center of the bumper of the vehicle to the left lane of the estimated lane information, the information on the right distance from the center of the bumper of the vehicle to the right lane of the estimated lane information, the information on the heading angle of the vehicle of the estimated lane information, and the information on the curvature of the lane of the estimated lane information, using pre-test information, and to determine the permissible recognition range with respect to the lane information to be subsequently input based on each set error range.

5. The vehicle steering control apparatus of claim 2, wherein the processor is further configured to, in response to the misrecognized lane information being information on any one of a left lane and a right lane, calculate an average value of widths of lanes through which the vehicle travels for a time period, correct the misrecognized lane information using the calculated average value and other recognized lane information, and performing feedback of the corrected lane information and the other recognized lane information.

6. The vehicle steering control apparatus of claim 2, wherein when the misrecognized lane information comprises information on a left lane and a right lane, the processor is further configured to calculate an average value of widths of lanes through which the vehicle travels for a time period, to correct information on the left lane and the right lane using the calculated average value and the lane information and to perform feedback of the corrected information on the left lane and the right lane.

7. The vehicle steering control apparatus of claim 1, wherein the misrecognized lane information is incorrectly recognized, and the misrecognized present input lane information is incorrectly recognized.

8. A method of steering a vehicle, comprising:
    estimating lane information to be subsequently input using feedback lane information;
    correcting lane information determined to be misrecognized, in response to present input lane information being determined to be misrecognized using the estimated lane information; and
    controlling steering of the vehicle based on the corrected lane information,
    wherein the correcting of the lane information comprises
        determining a permissible recognition range with respect to the lane information to be subsequently input using the estimated lane information, and
        determining the misrecognized present input lane information, in response to the present input lane information existing out of the determined permissible recognition range, and
    wherein the determining of the permissible recognition range comprises setting an error range with respect to information on a differential of a curvature of the estimated lane information.

9. The method of claim 8, wherein the correcting of the lane information further comprises:
    performing feedback of the corrected lane information.

10. The method of claim 9, wherein the lane information comprises any one or any combination of any two or more of information on a left distance from a center of a bumper of the vehicle to a left lane, information on a right distance from the center of the bumper of the vehicle to a right lane, information on a heading angle of the vehicle, information on the curvature of a lane, information on reliability of the lane information, information on a width of the lane, information on a viewing angle of a camera, information on reliability of the camera, and information on the visibility of the camera.

11. The method of claim 10, wherein the determining of the permissible recognition range further comprises:
    setting an error range with respect to each of the information on the left distance from the center of the bumper of the vehicle to the left lane of the estimated lane information, the information on the right distance from the center of the bumper of the vehicle to the right lane of the estimated lane information, the information on the heading angle of the vehicle of the estimated lane information, and the information on the curvature of the lane of the estimated lane information, using pre-test information; and determining the permissible recognition range with respect to the lane information to be subsequently input based on each set error range.

12. The method of claim 9, wherein the performing of the feedback of the corrected lane information comprises:

calculating an average value of widths of lanes through which the vehicle travels for a time period, in response to the misrecognized lane information being information on any one of the left lane and the right lane;

correcting the misrecognized lane information using the calculated average value and other recognized lane information; and feeding the corrected lane information and the other recognized lane information back to a processor.

13. The method of claim 9, wherein the performing of the feedback of the corrected lane information comprises:

calculating an average value of widths of lanes through which the vehicle travels for a time period, in response to the misrecognized lane information being information on the left lane and the right lane;

correcting the information on the left lane and the right lane using the calculated average value and the lane information estimated by the lane information recognition state determiner; and feeding the corrected information on the left lane and the right lane back to a processor.

14. A control apparatus to steer a vehicle, comprising:

a corrector configured to estimate lane information to be subsequently input using self-feedback lane information, and correct lane information determined to be misrecognized, in response to present input lane information being determined to be misrecognized using the estimated lane information; and a steering controller configured to control steering of the vehicle based on the corrected lane information, wherein the corrector comprises a lane information recognition state determiner configured to estimate the lane information to be subsequently input using feedback lane information, determine a permissible recognition range with respect to the lane information to be subsequently input using the estimated lane information, and determine the misrecognized present input lane information, in response to the present input lane information existing out of the determined permissible recognition range, and a lane information corrector configured to correct the misrecognized lane information by the lane information recognition state determiner using the lane information estimated by the lane information recognition state determiner, and feed the corrected lane information back to the lane information recognition state determiner, wherein the lane information comprises any one or any combination of any two or more of information on a left distance from a center of a bumper of the vehicle to a left lane, information on a right distance from the center of the bumper of the vehicle to a right lane, information on a heading angle of the vehicle, information on curvature of a lane, information on a differential of the curvature, information on reliability of the lane information, information on a width of the lane, information on a viewing angle of a camera, information on the reliability of the camera, and information on the visibility of the camera, and wherein the lane information recognition state determiner is further configured to estimate the lane information to be subsequently input using the feedback lane information, information on a yaw rate of the vehicle, and information on a speed of the vehicle, set an error range with respect to each of the information on the left distance from the center of the bumper of the vehicle to the left lane of the estimated lane information, the information on the right distance from the center of the bumper of the vehicle to the right lane of the estimated lane information, the information on the heading angle of the vehicle of the estimated lane information, the information on the curvature of the lane of the estimated lane information, and information on the differential of the curvature of the estimated lane information using pre-test information, and determine the permissible recognition range with respect to the lane information to be subsequently input based on each set error range.

* * * * *